United States Patent
Nissim

(10) Patent No.: US 9,760,335 B2
(45) Date of Patent: Sep. 12, 2017

(54) MODULAR AIRBORNE DISPLAY SYSTEM

(71) Applicant: Amnon Nissim, Herzlia (IL)

(72) Inventor: Amnon Nissim, Herzlia (IL)

( * ) Notice: Subject to any disclaimer, the term of this patent is extended or adjusted under 35 U.S.C. 154(b) by 417 days.

(21) Appl. No.: 14/321,951

(22) Filed: Jul. 2, 2014

(65) Prior Publication Data

US 2015/0009094 A1  Jan. 8, 2015

Related U.S. Application Data

(60) Provisional application No. 61/842,434, filed on Jul. 3, 2013.

(51) Int. Cl.
*G09G 1/00* (2006.01)
*G06F 3/14* (2006.01)
*G09G 3/00* (2006.01)

(52) U.S. Cl.
CPC .......... *G06F 3/1446* (2013.01); *G09G 3/001* (2013.01); *G06F 3/1438* (2013.01); *G09G 2300/026* (2013.01); *G09G 2360/04* (2013.01)

(58) Field of Classification Search
CPC . G06F 3/1423; G06F 1/00; G06F 3/00; G06F 1/1652; G06F 3/0488; H04N 21/462; H04N 21/43; G09G 1/00; G09G 5/14
See application file for complete search history.

(56) References Cited

U.S. PATENT DOCUMENTS

| | | | | |
|---|---|---|---|---|
| 2006/0178758 A1* | 8/2006 | Koriat | .................... | G09B 9/003 700/12 |
| 2013/0265487 A1* | 10/2013 | Yu | ............................. | H04N 9/12 348/383 |
| 2013/0278482 A1* | 10/2013 | Hsu | ........................ | G06F 3/1423 345/1.3 |
| 2014/0233099 A1* | 8/2014 | Stark | ....................... | G09F 21/06 359/446 |

\* cited by examiner

*Primary Examiner* — Michael Faragalla

(57) ABSTRACT

A modular airborne display system, the system comprising: a plurality of airborne display modules (ADMs) such that each ADM comprises a display unit, a local control unit and a lifting unit; and a central control unit for synchronizing the plurality of ADMs to generate a combined image to be displayed by separately instructing each one of the plurality of ADMs to present a portion of the combined image and to arrive at a respective presentation location.

13 Claims, 4 Drawing Sheets

MODULAR AIRBORNE DISPLAY SYSTEM

RELATED APPLICATION

This application claims the benefit of priority under 35 USC 119(e) of U.S. Provisional Patent Application No. 61/842,434 filed Jul. 3, 2013, the contents of which are incorporated herein by reference in their entirety.

FIELD AND BACKGROUND OF THE INVENTION

The present invention, in some embodiments thereof, relates to a display system and, more particularly, but not exclusively, modular airborne display system.

Existing airborne displays are mostly banners attached to an aircraft.

Electronically displaying images in large scale is usually achieved by using large fixed screens. Portable screen are limited in their weight and/or size.

Some solutions for this limitation have been proposed. For example, U.S. Patent Application Publication No. 2007/0262701, published on Nov. 15, 2007 describes a structure for a large-scale display screen formed by piecing together a large number of modules.

SUMMARY OF THE INVENTION

According to some embodiments of the invention, there is provided a modular airborne display system, the system comprising: a plurality of airborne display modules (ADMs) such that each ADM comprises a display unit, a local control unit and a lifting unit; and a central control unit for synchronizing the plurality of ADMs to generate a combined image to be displayed by separately instructing each one of the plurality of ADMs to present a portion of the combined image and to arrive at a respective presentation location.

Optionally, each of the plurality of ADMs is separate from other ADMs and navigates by itself using the lifting unit and the local control unit in accordance with respective instructions from the central control unit.

More optionally, each of the plurality of ADMs is instructed to a specific location by the central control unit and maintains the specific location by itself using the local control unit.

Optionally, each of the plurality of ADMs further comprising a bonding mechanism for detachably connecting to at least one another of the plurality of ADMs.

More optionally, at least some of the plurality of ADMs are connected to one another using the bonding mechanism before they are lifted to the air.

More optionally, at least some of the plurality of ADMs are launched separately and connect to other ADMs using the bonding mechanism while airborne.

More optionally, the bonding mechanism comprises a unit for releasing its connection to other ADMs while airborne upon command from at least one of the local control unit and the central control unit.

More optionally, at least one of the plurality of ADMs establishes at least one of data communication link and power connection with another of the plurality of ADMs which is connected thereto using the bonding mechanism.

Optionally, the system further comprises a cable electronically connecting the plurality of ADMs to a ground unit to establish at least one of power connection and data communication link.

More optionally, the cable is supported by one or more lifting units to maintain upper part of the cable airborne and to prevent the cable from dragging down the plurality of ADMs.

According to some embodiments of the invention, there is provided an airborne display module (ADM), comprising: a local control unit; a lifting unit; a support structure; and a plurality of flexible threads extended and spread by the support structure; wherein each one of the plurality of flexible threads comprises a plurality of display subunits each displays a single pixel and controlled by the local control unit.

Optionally, the support structure is a detachable separate frame attached to the lifting unit upon deployment.

Optionally, the support structure comprises a plurality of collapsible ribs, each one of the plurality of collapsible ribs having a rigid state and a collapsed state, so when the ADM is deployed, each one of the plurality of collapsible ribs is at the rigid state.

More optionally, the each one of the plurality of collapsible ribs comprises a plurality of tubes threaded on a wire so that the ribs become rigid when the wire is tensioned.

Optionally, the plurality of flexible threads are tensioned in parallel to one another so that the plurality of display subunits of one of the plurality of flexible threads are evenly spaced and aligned with respective the plurality of display subunits of another of the plurality of flexible threads, thus creating a rectangular structure.

Optionally, the threads are arranged to form a plurality of separate rectangular structures each the separate rectangular structure having some of the plurality of flexible threads.

According to some embodiments of the invention, there is provided a method for displaying from the air, comprising: deploying a plurality of airborne display modules (ADMs) wherein each of the plurality of ADMs comprises a display unit, a local control unit and a lifting unit; providing an image to be displayed to a central control unit; dividing the image by the central control unit to a plurality of image portions; separately associating each of the plurality of ADMs with one of the plurality of image portions to be displayed by its display unit; separately instructing each of the plurality of ADMs to induce maneuvering for positioning in a specific location by the central control unit; and creating the image in the air wherein each of the plurality of ADMs is located according its associated image portion.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
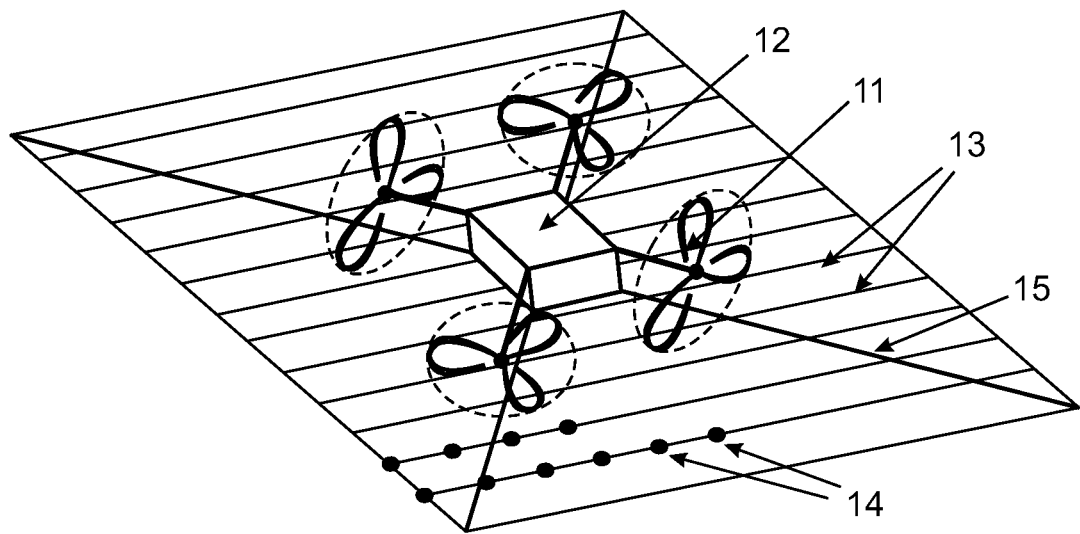
FIG. 1 is an airborne display module (ADM), according to some embodiments of the present invention.

The present invention, in some embodiments thereof, relates to a display system and, more particularly, but not exclusively, modular airborne display system.

According to some embodiments of the present invention, there are provided airborne modular systems each capable of displaying large scale images and video. The system comprises a plurality of airborne display modules (ADMs), each displaying a part of the large image. Each ADM is an airborne device that comprises a display unit, each display unit comprises one or more pixel display subunits (PDSs) and a local control unit. The system further comprises a central control unit for continually synchronizing the ADMs to generate a combined image to be displayed using their PDSs by separately instructing each of the ADMs to present a portion of the combined image and to arrive at a respective presentation location.

Optionally, system total display size can vary according to need by using different amount of ADM's and/or ADMs of different sizes.

The system can be easily stored, transported and deployed, as each ADM can be handled separately and optionally foldable, according to some embodiments of the present invention. Moreover, as the system is modular, cost and display size are controlled by the operator.

A lifting unit is needed for flying the ADMs and allowing them to navigate. Also, power and communication has to be provided for the ADMs for their operation. Aspects of flying, power and communication can be handled by each ADM separately, or be combined for some or all ADMs.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
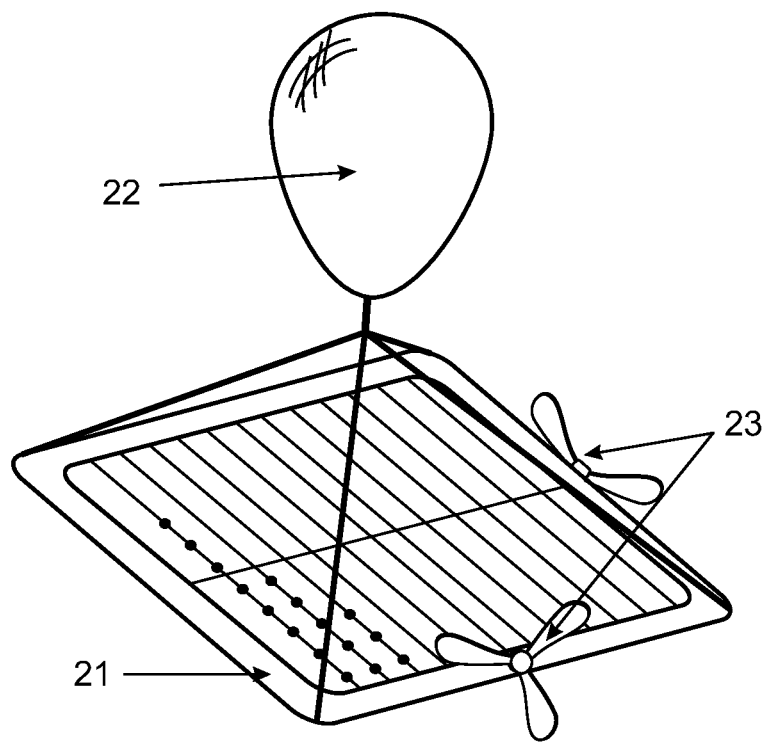
FIG. 2 is an ADM, according to other embodiments of the present invention.

Referring now to the drawings, FIG. 1 illustrates an ADM that contains a lifting unit 11, a local control unit 12 and flexible threads 13, wherein each thread contains PDSs 14, according to some embodiments of the present invention. The resulting flexible structure allows the ADM to be folded for transportation and storage, and also requires small ground staging area for deployment. Also, this structure makes the ADM lightweight so less energy is needed for lifting. FIG. 2 illustrates an ADM, according to some embodiments of the present invention.

Optionally, the threads are parallel, evenly spaced and of equal length, and comprise evenly spaced and aligned PDSs, so an array of PDSs is formed, as shown in FIG. 1. The display resolution of the array is X by Y whereas X is the number of PDSs on a thread and Y is the number of threads.

Optionally, the threads are arranged in a plurality of arrays, to further simplify folding and deployment.

Unlike folded position, the ADM has to be rigid in spread position, so PDSs are evenly spaced, and also in order to prevent ADMs from squashing other ADMs.

Optionally, flexible threads 13 are held in spread position by a support structure. The support structure could be, for example, X-shaped structure 15, as shown in FIG. 1 or square-shaped structure 21, as shown in FIG. 2. Support structure 15 or 21 has to be lightweight so it can be airborne.

Optionally, in order for the ADM to be foldable, the support structure is a removable frame, so when the frame is removed the ADM is non-rigid and can be folded.

Figure 3A:
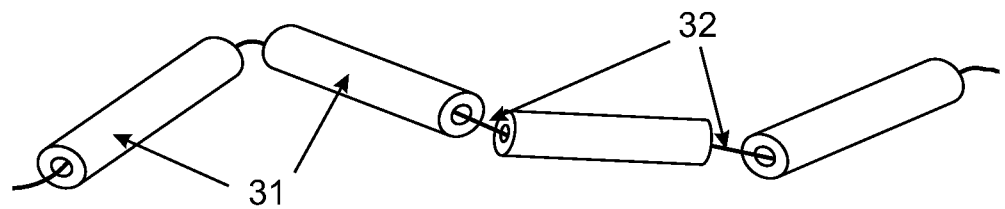
FIG. 3A schematically illustrates a portion of a rib structure in a non-rigid position, according to some embodiments of the present invention.
Figure 3B:
FIG. 3B schematically illustrates a portion of a rib structure in a rigid position, according to some embodiments of the present invention.

Optionally, the support structure comprises collapsible ribs having a rigid state and a collapsed state. When deployed the ribs are at a rigid state. For example, the collapsible ribs comprise elongated tubular ribs. FIG. 3A depicts a portion of a collapsible elongated tubular rib that is made of a plurality of tubes 31 threaded on a wire 32 so when the wire is tensioned, for example, between a small motor at one end and the last tube on the other, tubes 31 are pressured against each other to form an elongated tubular rib, as shown in FIG. 3B, according to some embodiments of the present invention. This rigid form is maintained as long as wire 32 is tensioned.

Usually, flat modular airborne display systems may be formed by the ADMs. However, non-flat modular airborne display systems can also be presented, according to some embodiments of the present invention. For example, if the ADMs are connected to one another in an angle, the complete display can have bended or ball-shaped structure. Also, the ADMs themselves can have a non-flat construction if needed, for example, by having a support structure that is bended, according to some embodiments of the present invention. An exemplary bended rib can be achieved by making the tubes bended or shorter on one side.

Optionally, the threads are made of a material flexible enough and strong enough so they would not tear or break during handling, for example, Nano Fibers.

Optionally, the PDSs comprise light emitting diodes (LEDs). Other possible sources of light sources are flexible displays OLED, small incandescent light bulb, High-power LEDs (HPLED), Light-emitting electrochemical cell (LEC), Arc Lamp or any future light omitting device (for example Quantum Dot LEDs).

Optionally, each PDS is capable of displaying multiple colors, For example, by using a color model such as Red, Green and Blue (RGB) or Cyan, Magenta, and Yellow (CMY), where the combination of lights in different brightness levels can be seen as a specific color.

Optionally, the PDSs do not comprise light sources. For example, each PDS comprises painted color units that can be replaced mechanically to display different colors. This option requires less energy for display than light sources. Optionally for this, a high power light source or sources on the ground illuminate the display.

Optionally, PDS will not be used as a display unit and instead a part of a printed picture will be used for each ADM, so that all of the ADMs together form the complete picture. This creates a static image in the sky and allows a cheaper solution since much less power and weight is used. Optionally for this, a high power light source or sources on the ground illuminate the display.

The lifting unit could be, for example, a helicopter rotor, a combination of rotors such as quadcopter 11 as shown in FIG. 1, or a hot air balloons 22 combined with propellers for navigation 23, as shown in FIG. 2.

Optionally, a combination of lifting units could be used, for example a quadcopter and helium balloon for reducing energy consumption during flight.

Optionally, each ADM comprise a lifting unit, allowing it to be lifted separately from other ADMs. Optionally, only some of the ADMs have a lifting unit and are lifting all other ADMs that are attached to them. In this case, the lifting unit has to be strong enough to lift all the ADMs attached to the ADM that comprise the lifting unit.

Optionally, the lifting units are designed with redundancy so the ADM or ADMs are still airborne in case of failure of one lifting unit. For example, three rotors of a quadcopter could still hold the ADM.

Optionally, each ADM comprise a decelerator such a pop-out parachute that can be used in case of a fatal malfunction in the lifting unit and prevent the ADM from crashing to the ground.

In order to display a complete seamless image, the individual ADMs have to be adjacent to one another. Optionally, the ADMs are completely autonomous and navigate to maintain their position relative to one another by communicating with one another or the central control unit. This is possible if the weather conditions are good, with no strong rain or wind, and the lifting unit navigation capabilities are accurate enough. Each ADM is launched individually and navigates to its place in the display, so relatively small ground staging area for deployment is needed, according to some embodiments of the present invention. Optionally, in case a single ADM fails a replacement ADM can be sent without taking down the entire display.

Figure 4:
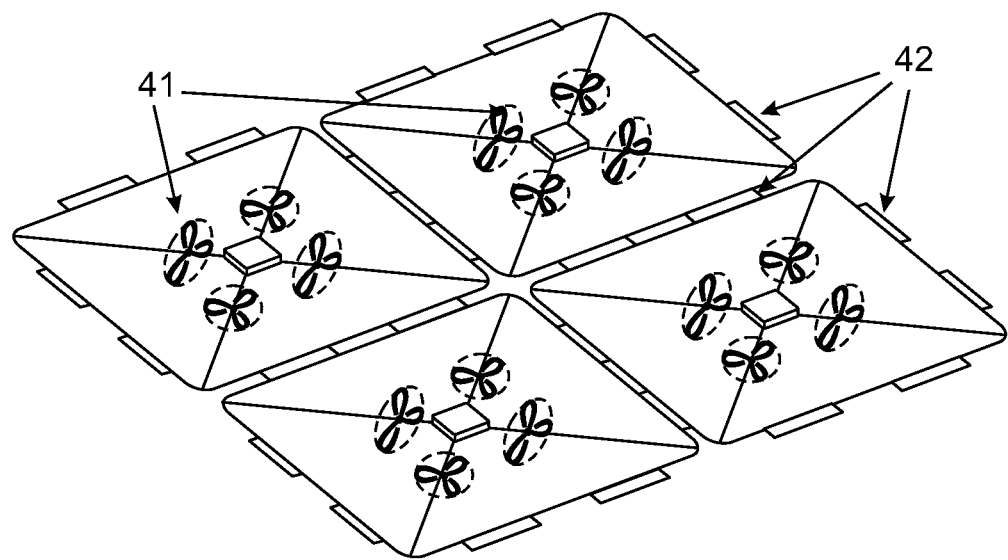
FIG. 4 is a modular airborne display system, comprising four ADMs, according to some embodiments of the present invention.

FIG. 4 shows a display system of four ADMs, according to some embodiments of the present invention. The number of ADMs is not limited to 4 and can be any number, for example, 6, 9, 20, 25 and so on.

Optionally, ADMs 41 further comprise a bonding mechanism 42 for connecting to other ADMs, for example, electromagnets, electrically controlled suction cups, Grab hooks, Velcro, Metaklett, so the ADMs can be attached to form one solid display.

Optionally, the ADMs are connected to one another on the ground before they are lifted to the air. This ensures all ADMs are fixed together and provide seamless image and also makes the system more resistant to harder weather conditions. This option is possible if the ground staging area for deployment is big enough to fit the entire system, according to some embodiments of the present invention.

Optionally, connecting the ADMs is done in stages, for example, by connecting 2 ADMs, and lifting the only the first ADM. While the first ADM is partially airborne and connected to a second ADM, connecting another ADM to the second ADM, then lifting the second ADM and so forth. Then, a smaller ground staging area is needed since space is not needed for the entire size of the complete display system—the ADMs that are already lifted do not occupy space on the ground. This allows for a smaller ground staging area that does not have to fit the entire system since not all ADMs are connected prior to liftoff.

Optionally, the ADMs are launched separately and connect to one another while airborne using their bonding mechanisms. This option combines the advantages of both autonomous and connected ADMs, as it provides a resistant system and ensures seamless image while still requiring small ground staging area and allowing the replacement of a failed ADM without taking down the entire display system.

Optionally, the final guidance of the ADMs before bonding is performed using additional sensors that guide each ADM to an exact location in respect to another ADM, thus simplifying the task of bonding between ADMs. Such sensors are, for example, laser guidance based, image processing based (for example the ADM can calculate it's relative position to the other ADMs by analyzing the pictures of a small on-board camera) and/or radio beacon. Using these sensors, the bonding can be performed by the ADMs without control from the central control unit.

Optionally, each ADM comprises a mechanism for releasing its connection to other ADMs while airborne. This mechanism can be triggered in case of an emergency, for example, when a single ADM's lifting unit fails. This ensures that if a single ADM fails, it will not bring down the entire display system.

Figure 5:
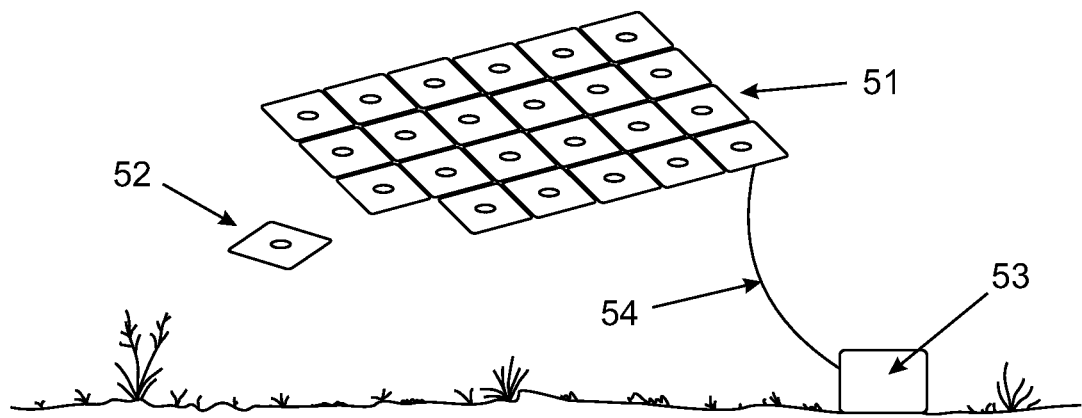
FIG. 5 is a modular airborne display system, according to some embodiments of the present invention.

Reference is also made to FIG. 5, which illustrates an exemplary display system, according to some embodiments of the present invention. ADMs 51 are connected to one another. ADM 52 is autonomous and can navigate to its respective position in the display, according to directions received from central control unit 53, and connect to ADMs 51 to form a complete display.

Both wired and wireless communications of ADMs with one another and/or with a central control unit are possible, according to some embodiments of the present invention. Communication type can be chosen according to deployment method.

Optionally, when ADMs are completely autonomous, wireless communication is used, for example, Wi-Fi, Cellular Data, IR, radio, Microware Transmitter, Laser transmitter, or any other method of transmitting data.

Optionally, when ADMs are connected to one another prior to liftoff, wired communication can be used. In this case, ADMs are all connected to a communication network such as Ethernet or LAN. The network is connected upon deployment and connects all the ADMs. Optionally, the network is connected to a ground unit 53 via a single wire 54, as shown in FIG. 5. This method allows all of the ADMs to communicate with one another and with ground unit 53 through fast connection, and allows ground unit 53 to send data to all ADMs at once or to a specific ADM when needed.

Optionally, ADMs are capable of both wired and wireless communications. This option is most suitable for ADMs that are launched separately and connect while airborne. Wireless communication can then be used to guide an ADM to its position, and after connection to other ADMs, wired communication can be used.

Optionally, one or more ADMs are provided with strong and robust wireless capabilities, and are connected to other ADMs through wired connection. This removed the requirement of having a cable connected to the ground unit while still enabling a sturdy and strong wireless connection that can be used for all ADMs without the need for all ADMs to have strong wireless capabilities. For example, wireless communication of each ADM is used to guide it into position and once connected to other ADMs, the image to be displayed is communicated using the stronger wireless to ensure less interference.

Figure 6:
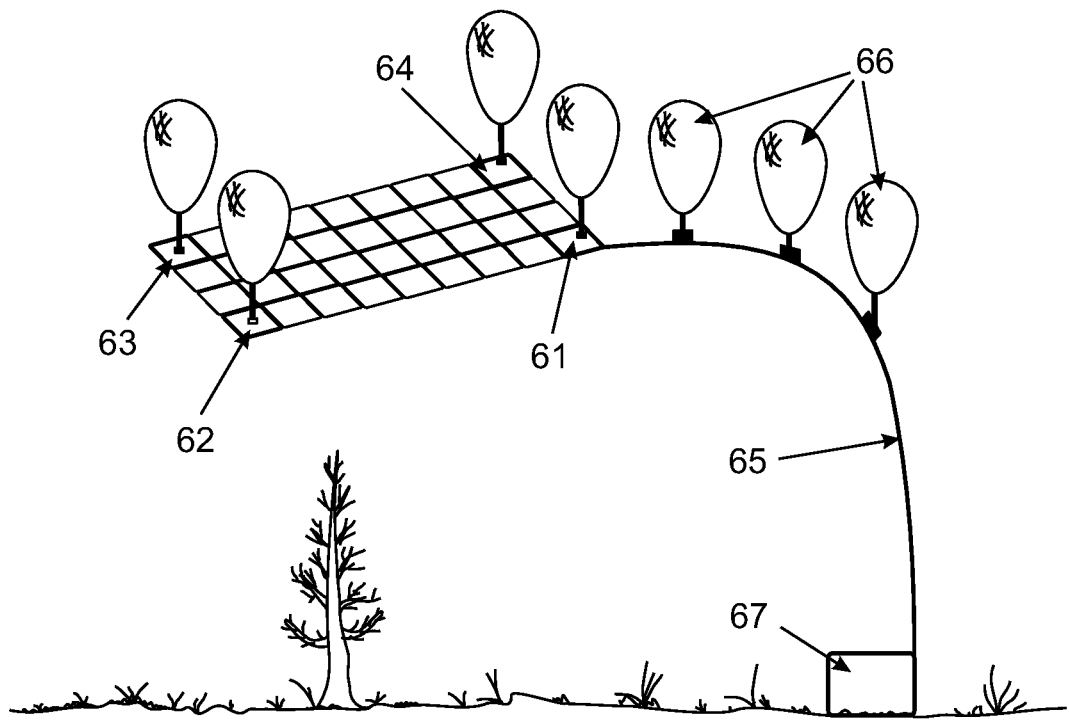
FIG. 6 is a modular airborne display system, according to other embodiments of the present invention.

Reference is also made to FIG. 6, which illustrates an exemplary display system, according to some embodiments of the present invention. ADMs 61, 62, 63 and 64 have lifting units and are lifting all other ADMs, as described above.

Providing power to the ADMs is necessary. Optionally, ADMs are connected to ground unit 67 by a power cable 65. Optionally, ADM 61 is connected to ground unit 67 and also connected to other ADMs to provide them with power. This is possible when the ADMs are connected prior to liftoff. Also, a power line can run between all connected ADMs and provide power according to some embodiments of the present invention.

Optionally, ADMs comprise batteries sufficient for their operation so no cables are required. This option is mandatory when the ADMs are completely autonomous. Optionally, an ADM can alert when its battery power is low, and can also be programmed to return to the ground when power is low.

Optionally, ADMs are provided with batteries and also connected to ground unit by cable. This option is most suitable for ADMs that are launched separately and connect while airborne. For example, batteries can then be used to bring an ADM to its position and after connection to other ADMs, power can be provided by one or more ADMs that are connected to a ground unit by cable.

The navigation of each ADM is controlled by its local control unit, according to some embodiments of the present invention. Navigation includes, for example, keeping steady orientation, maintaining position relative to the ground, bonding with other ADMs, maintaining position relative to other ADMs and/or compensating for winds and/or other disruptions.

Optionally, the local control unit of an ADM can communicate with control units of other ADMs in order to synchronize their flight. For example, an ADM that has a sudden altitude loss can alert other ADMs so they can adjust their altitude accordingly.

Optionally, the local control unit of one ADM also controls the navigation of other ADMs, or some aspects of their navigation such as altitude, position or orientation.

Optionally, navigation of all ADMs in the display system is controlled by a central control unit. Optionally, only some aspects of navigation are controlled by the central control unit while other aspects are controlled by the local control units of each ADM.

Optionally, each ADM comprise multiple sensors that can help navigation, such as, but not limited to, accelerometer, wind meter, height sensor, speed sensor and/or barometer. The data from these sensors is analyzed in the local control unit or transmitted to the central control unit.

Optionally, for safety purposes, each ADM is programmed to keep steady or guide itself back to the ground in case of communication loss from the central control unit or in case of other failures.

A central control unit synchronizes the ADMs and provides each ADM with the part of the image for display, according to some embodiments of the present invention. Operation of individual PDSs is controlled by the local control unit of each ADM. The local control unit communicates with the central control unit in order to receive the image it needs to display. Optionally, the central control unit also guides the ADMs to the required location.

Optionally, the central control unit can be located on one of the ADMs and be controlled from the ground through wireless or wired communication. Optionally, the central control unit can be located in a ground unit. Optionally, the central control unit is distributed in all or some of the ADMs.

Optionally, as shown in FIG. 6, a cable 65 connecting the ADMs to a ground unit 67, used for communication and/or power supply, is supported by one or more lifting units 66 so it will not drag down the ADMs because of its weight. For example, hot air balloons can hold the cable next to the ADMs and thus prevent tension between the cable and the ADMs.

Although this invention relates to a display system, the ADMs can also be used for other airborne uses, for example, holding a big printed poster in the sky.

Figure 7:
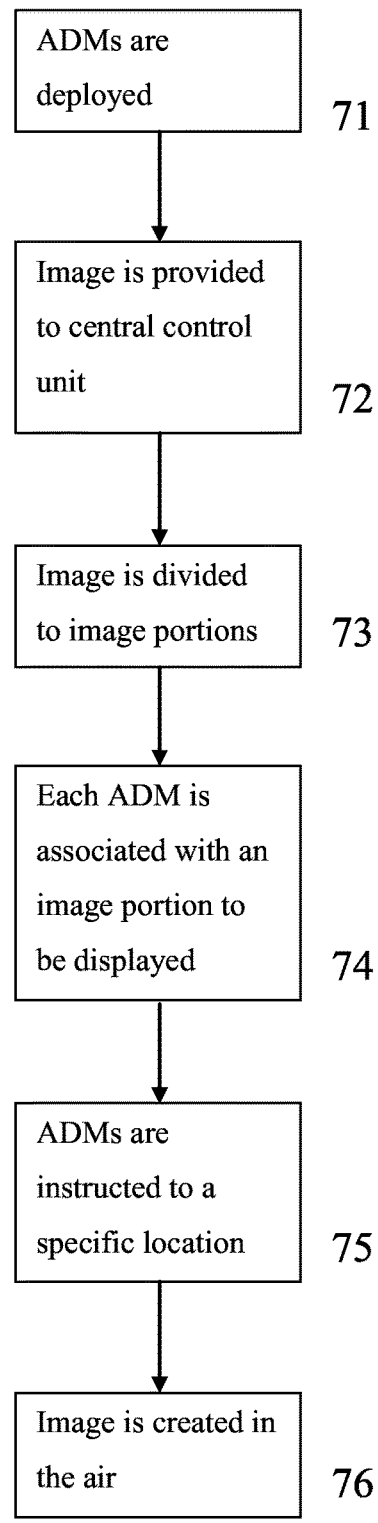
FIG. 7 is a flowchart schematically representing a method for displaying from the air, according to some embodiments of the present invention.

Reference is now also made to FIG. 7, which is a flowchart of a process of displaying from the air, according to some embodiments of the present invention.

First, as shown at 71, ADMs are deployed. This can be performed in different ways, as described above. ADMs can also have different structures, as described above.

Then, as shown at 72, an image to be displayed is provided to the central control unit and divided to image portions by the central control unit, as shown at 73. For example, when 9 ADMs are deployed, the image is divided to 9 portions by an algorithm implemented in the central control unit, so that all 9 portions form the complete image.

Each ADM is then associated with an image portion to be displayed, through some communication method as described above, such as wired or wireless, as shown at 74. Optionally, the local control unit of each ADM assigns each pixel of the image portion to a PDS of the ADM.

The ADMs are then each separately instructed by the central control unit to maneuver to a specific location, corresponding to the image portion associated to it, as shown at 75. Optionally, the associated image portion assigned to an ADM can be changed dynamically during operation. This maneuvering can optionally be performed by direct control of the central control unit over the lifting units of each ADM, or by general maneuvering commands issued by the central control unit and then performed by the local control unit of each ADM.

Then, each ADM is positioned correctly in its relative place to form the image, so that full image is then created by the image portions displayed by the ADMs, as shown at 76. Optionally, in case of a failure in one of the ADMs, it can be directed by the central control unit to return to the ground while a replacement ADM is associated with the missing image portion and is positioned in place of the failed ADM.

It is expected that during the life of a patent maturing from this application many relevant display systems will be developed and the scope of the term frame holder is intended to include all such new technologies a priori. As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A modular airborne display system, said system comprising:
   a plurality of airborne display modules (ADMs) such that each ADM comprises a display unit, a local control unit and a lifting unit; and
   a central control unit for dividing an image to a plurality of image portions, for associating each of said image portions with another one of said plurality of ADMs, for sending to each of said plurality of ADMs another one of said plurality of image portions associated with said each of said plurality of ADMs to be displayed by said display unit and for sending different navigation instructions to each of said plurality of ADMs to arrive, using said lifting unit, at a respective presentation location, said respective presentation location corresponds to said another one of said plurality of image portions associated with said each of said plurality of ADMs.

2. The system of claim 1, wherein each of said plurality of ADMs is separate from other ADMs and navigates by itself using said lifting unit and said local control unit in accordance with respective instructions from said central control unit.

3. The system of claim 2, wherein each of said plurality of ADMs is instructed to a specific location by said central control unit and maintains said specific location by itself using said local control unit.

4. The system of claim 1, wherein each of said plurality of ADMs further comprising a bonding mechanism for detachably connecting to at least one another of said plurality of ADMs.

5. The system of claim 4, wherein at least some of said plurality of ADMs are connected to one another using said bonding mechanism before they are lifted to the air.

6. The system of claim 4, wherein at least some of said plurality of ADMs are launched separately and connect to other ADMs using said bonding mechanism while airborne.

7. The system of claim 4, wherein said bonding mechanism comprises a unit for releasing its connection to other ADMs while airborne upon command from at least one of said local control unit and said central control unit.

8. The system of claim 4, wherein at least one of said plurality of ADMs establishes at least one of data communication link and power connection with another of said plurality of ADMs which is connected thereto using said bonding mechanism.

9. The system of claim 1, further comprising a cable electronically connecting said plurality of ADMs to a ground unit to establish at least one of power connection and data communication link.

10. The system of claim 9, wherein said cable is supported by one or more lifting units to maintain upper part of said cable airborne and to prevent said cable from dragging down said plurality of ADMs.

11. A method for displaying from the air, comprising:
   deploying a plurality of airborne display modules (ADMs) wherein each of said plurality of ADMs comprises a display unit, a local control unit and a lifting unit;
   providing an image to be displayed to a central control unit;
   dividing said image by said central control unit to a plurality of image portions;
   separately associating each of said plurality of ADMs with one of said plurality of image portions to be displayed by its display unit;
   separately instructing, by said central control unit, each of said plurality of ADMs to induce maneuvering, using said lifting unit, for positioning in a specific location, said specific location corresponds to said one of said plurality of image portions associated with said each one of said plurality of ADMs; and creating said image in the air wherein each of said plurality of ADMs is located according its associated image portion.

12. The system of claim 1, wherein said portion of said combined image presented by each of said plurality of ADMs is dynamically changed during operation.

13. The system of claim 3, further comprising at least one sensor used by said local control unit to arrive at said respective presentation location and to maintain said specific location.

* * * * *